United States Patent
Damkjær (10) Patent No.: US 7,419,051 B2
(45) Date of Patent: Sep. 2, 2008

(54) SIDE-FLEXING CONVEYOR BELT

(75) Inventor: Poul Erik Damkjær, Vejle (DK)

(73) Assignee: PED Invest A/S, Vejle Oest (DK)

( * ) Notice: Subject to any disclaimer, the term of this patent is extended or adjusted under 35 U.S.C. 154(b) by 175 days.

(21) Appl. No.: 11/260,909

(22) Filed: Oct. 28, 2005

(65) Prior Publication Data

US 2006/0090988 A1    May 4, 2006

(30) Foreign Application Priority Data

Oct. 29, 2004    (DK) .................. 2004 01669

(51) Int. Cl.
*B65G 17/06* (2006.01)
(52) U.S. Cl. .................. 198/853; 198/850; 198/852
(58) Field of Classification Search .............. 198/850, 198/852, 853
See application file for complete search history.

(56) References Cited

U.S. PATENT DOCUMENTS

| | | | | |
|---|---|---|---|---|
| 2,661,728 A | * | 12/1953 | Thorner | 123/389 |
| 2,681,728 A | * | 6/1954 | Boron | 198/851 |
| 3,628,834 A | | 12/1971 | Anderson | 305/35 R |
| 4,159,763 A | * | 7/1979 | Kewley et al. | 198/853 |
| 4,222,483 A | * | 9/1980 | Wootton et al. | 198/831 |
| 4,394,901 A | | 7/1983 | Roinestad | 198/850 |
| 4,615,343 A | * | 10/1986 | Komossa | 131/111 |
| 4,972,942 A | * | 11/1990 | Faulkner | 198/853 |

(Continued)

FOREIGN PATENT DOCUMENTS

DE    10027229    12/2001

(Continued)

*Primary Examiner*—Gene O. Crawford
*Assistant Examiner*—Kavel P Singh
(74) *Attorney, Agent, or Firm*—Woodcock Washburn LLP (57) ABSTRACT

An endless side-flexing conveyor is described comprising a conveyor belt made from a number of rows of hinged interconnected belt links, where each row comprises at least one link, where each link has a front end, a back end, a top surface, a bottom surface and two sides, where hinge parts separated by apertures are arranged along the front end and the back end such that front hinge parts on the front end will fit inside apertures on the back end of an adjacent belt link, and where the front end and back end are substantially parallel to a first axis parallel to the width direction of the link, wherein the hinge parts of each link are defined by a top and bottom which are substantially flush with the top and bottom surfaces respectively, and two side surfaces and a free front surface, and that the front hinge parts on one end of each link are provided with a protrusion on each side surface, where the protrusions fit inside elongated apertures provided in the side surfaces of the rear hinge parts on the opposite end of the link; and further that the protrusions on more than one of the front hinge parts arranged centrally on the link are arranged on an axis parallel to the first axis, and that at least the protrusions on one or more of the outermost front hinge parts on one side of each link are arranged parallel to an axis angled +x° in relation to the first axis and that one or more protrusions on the opposite side of each link are arranged parallel to an axis angled −x° in relation to the first axis.

6 Claims, 7 Drawing Sheets

U.S. PATENT DOCUMENTS

| | | | |
|---|---|---|---|
| 5,024,321 A * | 6/1991 | Lapeyre | 198/853 |
| 5,497,874 A | 3/1996 | Layne | |
| 5,775,480 A | 7/1998 | Lapeyre et al. | |
| 6,732,856 B2 | 5/2004 | Maine, Jr. | 198/850 |
| 6,896,126 B2 * | 5/2005 | Guldenfels | 198/853 |

FOREIGN PATENT DOCUMENTS

| | | |
|---|---|---|
| EP | 0175483 | 3/1986 |
| EP | 0878148 | 11/1998 |
| EP | 1219550 | 7/2002 |
| NL | 9101711 | 5/1993 |
| WO | WO 97/28072 | 8/1997 |

\* cited by examiner

SIDE-FLEXING CONVEYOR BELT

CROSS REFERENCE TO RELATED APPLICATION

This application claims the benefit of Danish Application No. PA 2004 01669 filed Oct. 29, 2004, which is hereby incorporated by reference in its entirety.

FIELD OF THE INVENTION

The present invention relates to an endless side-flexing conveyor comprising a conveyor belt made from a number of rows of hinged interconnected belt links as set out in the introducing part of claim 1.

BACKGROUND OF THE INVENTION

It is known to have endless belt conveyor assemblies which are side-flexing. Usually, this construction is made by providing apertures in the eye parts perpendicular to the travelling direction. By overlapping the eye parts of two adjacent chain links, and inserting a transverse rod through the apertures, thereby connecting two adjacent chain links in a hinge-like manner, the two adjacent chain links will be able to flex relative to each other due to the possibility of the rod to move in the elongated shape of the overlapping apertures.

Such prior art constructions are known from for example EP 427337, EP 1306323 and others.

Common for the prior art endless belt conveyor is that it comprises a number of drawbacks. When conveyors are to transport food stuffs, either in raw or manufactured form, there are varying degrees of requirements to the hygiene levels which must be maintained for all equipment involved in the processing of food stuffs. Especially for fresh food stuffs it is important to have an extremely high level of hygiene in order to avoid contamination of the food stuffs from residue stuck in the belt construction, or other sources arising from an inability to satisfactorily clean and disinfect the endless belt conveyor.

Another serious drawback of conveyors of this type is the fact that as the conveyors are loaded and going through a curve, a substantial force will be induced in the outer part of the conveyor belt where the main part of the tension arises due to the pulling forces propelling the endless belt conveyor. For this purpose, a number of solutions have been proposed where reinforcement plates, sometimes in the shape of steel plates, are arranged in the outer sections connecting adjacent chain links such that these steel links will transfer the substantial forces arising when such an endless conveyor belt flexes to one side or the other.

It has also been suggested to reinforce the transverse rods such that the rods will be able to transfer the load from one flexing link to the adjacent link. However, when the transverse rods are made from plastic materials, the wear and tear in the transverse rods historically has shown that the life expectancy of such rods is very limited, which again results in increased maintenance costs, and extended periods of down time for the conveyor. By replacing the plastic transverse rods with steel rods as also suggested in the prior art, the wear and tear is transferred from the rods to the eye parts integral with the links such that, eventually, the eye part will be worn down whereby the entire link needs to be replaced.

Returning to the issue of hygiene, it has proven very difficult to thoroughly clean the apertures in which the transverse rods are arranged. This is due to the fact that the apertures have a limited size, but still provide play for the transverse rods such that the side-flexing capabilities of the entire conveyor belt may be provided in a substantially effortless manner, i.e. such that no substantial friction arises in the eye parts which could lead to heat generation, and deterioration of the plastic material. This play and the oversize allows for foreign matter, for example organic residue originating from the materials being transported on the conveyor, to become lodged, and which will only be removed during the cleaning process when particular care is exhibited. The residue organic material will give rise to bacteria growth, which may cause contamination of the articles transported on the conveyor belt which, in turn, might have serious complications for the end user.

OBJECT OF THE INVENTION

It is, therefore, an object of the present invention to provide an endless side-flexing conveyor, where the drawbacks mentioned above are alleviated, and which provides additional advantages, which will be evident from the following description.

SUMMARY OF THE INVENTION

This object has been achieved by providing an endless side-flexing conveyor comprising a conveyor belt made from a number of rows of hinged interconnected belt links, where each row comprises at least one link, where each link has a front end, a back end, a top surface, a bottom surface and two sides, where hinge parts separated by apertures are arranged along the front end and the back end such that front hinge parts on the front end will fit inside apertures on the back end of an adjacent belt link, and where the front end and back end are substantially parallel to a first axis parallel to the width direction of the link, wherein the hinge parts of each link are defined by a top and bottom which are substantially flush with the top and bottom surfaces respectively, and two side surfaces and a free front surface, and that the front hinge parts in one end of each link are provided with a protrusion on each side surface, where the protrusions fit inside elongated apertures provided in the side surfaces of the rear hinge parts on the opposite end of the links; and further that the protrusions on more than one of the front hinge parts arranged centrally on the link are arranged on an axis parallel to the first axis, and that at least the protrusions on one or more of the outermost front hinge parts on one side of each link are arranged parallel to an axis angled +x° in relation to the first axis and that one or more protrusions on the opposite side of each link are arranged parallel to an axis angled −x° in relation to the first axis.

With this construction the connection between two adjacent chain links is established without the use of a transverse rod such that the problems relating to the transverse rod as described above are completely alleviated. Furthermore, by being able to assemble adjacent chain links without the use of a rod, substantial saving in the moulds for shaping the chain links may be achieved. Moreover, assembly of two adjacent chain links is simplified, which again provides a cost-saving parameter which is substantial in that an endless belt conveyor traditionally comprises a very large number of chain links which need to be assembled, and by avoiding the transverse rod assembly, the savings when assembling two adjacent chain links becomes considerable when multiplied by the number of assemblies which are necessary in order to assemble the entire conveyor belt.

The protrusions which are partly replacing the transverse rods are moulded as integral parts of the chain link. Thereby it is foreseen that no foreign matter will be able to become lodged in the connection between the protrusions and the hinge parts, which are fairly easy to clean. The elongated apertures provided in the rear hinge parts opposite the front hinge parts with the protrusions have, due to the fact that the protrusions only fill a limited part of this space, a larger opening which facilitates that more cleaning fluid may be sprayed into the apertures and easily drain out again such that an improved cleaning process may be achieved.

By, furthermore, angling the outermost protrusions at both sides, it is achieved that the tension arising in the chain links as the conveyor belt goes through a curve is divided on a number of equally loaded protrusions, such that the force transferred to the protrusions is not to be taken up by one protrusion, mainly the outermost, but may be distributed on a number of protrusion. As the belt is running through straight sections, the centrally arranged front hinge parts with integral protrusions will transfer the force from one link to the other. In this manner the force resulting from rotating the loaded conveyor belt is always transferred from one chain link to the adjacent chain link by a number of protrusions, such that the forces distributed thereby will have a lesser impact on each hinge part.

In a further advantageous embodiment, each protrusion has an elongated cross section such that the length "a" of the protrusion in the intended travelling direction of the conveyor belt is longer than the height "b" perpendicular to the length.

The elongated cross section of the protrusions provides for optimum load transferring possibilities from the protrusion as such which is integral with the hinge part into the hinge part and thereby to the bulk of the material of the chain link. As the elongated shape allows for the side-flexing capabilities of the assembled conveyor belt, due to the even longer elongated apertures in which the protrusion are intended to the arranged, the elongation of the protrusion do not impede the entire conveyor's ability to have side-flexing capabilities.

In a further advantageous embodiment a recess is provided in the side surfaces of the rear hinge parts in which apertures are arranged such that the recess connects the aperture with the bottom of the protrusion.

By providing such a recess in the bottom section of the belt link it is achieved that any moisture/liquid which may otherwise be present in the aperture will have an improved drainage. The recesses in the rear hinge parts equipped with apertures may advantageously not connect such that a separate recess is provided on either side of each rear hinge part. In this manner the rear hinge parts' strength is maintained in that a bridge is maintained in the lower part of the rear hinge part for transferal of forces, and at the same time the recess will provide the necessary draining in the aperture.

In a still further advantageous embodiment the recess has an opening in the intended travelling direction of c where a>c>=b. Having this relationship between the protrusions and the recess makes it possible to place and connect adjacent chain links by simply turning one chain link 90° in relation to the other chain link. In this manner, the shortest dimension "b" of the protrusion on one chain link will be able to pass, perhaps by applying a slight force, through the opening "c" provided in the recess. This is, of course, only possible when the extent of the protrusion in the width direction of the conveyor belt is less than the depth of the corresponding recess in the width direction of the conveyor belt plus the built-in play between the front hinge parts and the apertures between two rear hinge parts.

In comparison to conveyor belts where adjacent chain links are connected by means of transverse rods, the assembly and disassembly, and thereby also replacement of each link or a number of links, is especially advantageous in that no tools or a number of separate parts are necessary in order to replace the links. The links are simply pivoted approximately 90° in relation to an adjacent link, and may be removed either by simply pulling the links apart, or by inserting for example a screwdriver in the aperture between two rear hinge parts, and carefully exerting a little pressure whereby the protrusion will pop out through the recesses provided in the adjacent chain link. In a similar manner, two chain links may be assembled simply by placing one link at a 90° orientation to the link to which it is supposed to be connected such that the protrusions are superposed the recesses. By applying a slight tap to the chain link, the protrusion will slide through the recesses, and by pivoting the chain links into substantially the same plane a hinge-like connection is established.

In a further advantageous embodiment of the invention, the angle x is in the interval $0°<x<=8°$ more preferred between $1<x<5$, and most preferred between 2° and 3,5°. These intervals for orientating the axis in relation to the main axis perpendicular to the intended travelling direction are selected such that the conveyor belt will be able to go through turns corresponding to two times the width of the conveyor belt. For traditional side-flexing conveyor belts where the chain links are assembled by means of transverse rods, the normal design provides for a turning radius of 2.2 times the width of the belt. In this manner by the inventive conveyor belt according to the present invention, tighter turns with a better load distribution between each link is achieved.

In a further advantageous embodiment the width of the conveyor corresponds to the width of one belt link, and that at least two or more front hinge parts on each side of the link comprises protrusions which are arranged parallel to axis angled $+/-x°$ with respect to the first axis, and that the protrusions on at least two or more centrally arranged front hinge parts are arranged on a common axis parallel to the first axis. Due to the construction of the links in the conveyor belt, it is possible to manufacture the links in a substantial width. For a number of applications, the width of the belt may be bridged by one single link. In other applications as suggested above, the links may be assembled in a bricklaying pattern in order to create the desired width of the resulting conveyor. When, however, the conveyor is made up of one single belt link in the width direction of the conveyor, the links may be constructed such that their integrity providing a central carrying member spanning the entire width of the chain links on which carrying member the integrally arranged hinge parts are provided, whereby it becomes possible to only support the conveyor belt according to the present invention along the sides of the belt links. Furthermore, with the angular relationship between the protrusions in the sides in relation to the protrusions in the central part of the belt link, the fully side-flexing capabilities are maintained.

In a still further advantageous embodiment of the invention, the apertures between the front hinge parts have a generally key hole shaped configuration when seen in the transport plane of the belt, and that the rear hinge parts are generally rectangular such that the width of the rear hinge parts perpendicular to the intended transport direction substantially corresponds to the narrowest section of the key hole shaped aperture, and that when two adjacent chain links are pushed together, it is possible for gas and/or liquid to pass through the belt in a direction substantially perpendicular to the transport plane of the belt.

Maintaining open space even when two adjacent chain links are forced together provides a number of advantages which may be exploited in different applications. In situations where it is desirable to provide drainage, the liquids may leave the conveying surface through the apertures provided in the conveying surface. Furthermore, in some applications, for example in connection with ovens for baking bread, pizza and the like, it is desirable to be able to cool the objects before they are transferred onto the following processes such as for example packaging and the like. In these instances it might be desirable to circulate cooling air through the conveyor belt in order to cool the objects placed on the conveyor. This is facilitated by the apertures, for example as provided by designing half the apertures as key holes, whereby it will be possible under all circumstances to circulate ventilation air through the conveyor. This is also true if the air/gas is a cooling media, which may advantageously be used in freezing tunnels and the like.

In a further advantageous embodiment, the links are made from a plastic material and the links are continually manufactured in an injection moulding process, such that the links are assembled preferably in or immediate approximate to the injection moulding machine in lengths of the conveyor belt, for example in lengths 2 m to 6 m, more preferred 3 m to 5 m. One of the problems associated with injection moulding of plastic belt link of the size, which is contemplated within the present invention, is the tendency of the links immediately after being moulded and de-moulded to twist, or otherwise deform. For this purpose, the links may advantageously be placed on a flat surface in order to cool, whereby the plastic material achieves a certain degree of internal integrity, and thereby will be less likely to deform. By furthermore arranging means such as for example a robot for moving the chain links from the flat surface after cooling and into storage, but before placing in storage, assembling the links as described above into finished conveyor belts sections, where each section may be for example 2 m up to 6 m, the following procedures of assembling the conveyor belt may be substantially rationalized in that a substantial part of the finished conveyor belt already is pre-assembled at the factory.

In a further advantageous embodiment substantial cleaning advantages are achieved in that in the rear hinge parts wherein elongated apertures are provided in the rear hinge parts side surfaces, an aperture perpendicular to the top surface and connecting the elongated apertures with the top surface is arranged. The aperture connecting the top surface of the chain links with the elongated apertures in the side surfaces of the rear hinge parts improves the cleaning process in that means may be arranged adjacent the conveyor belt, for example underneath or anywhere suitable, which means provides water jets which may flush out any material which may be stuck in the aperture, or more importantly in the elongated apertures in the rear hinge parts. Furthermore, by having the side-flexing motion of the adjacent chain links, the protrusions fixed in the elongated apertures in the rear hinge parts will, by providing liquid through the apertures connecting the top surface to the elongated apertures, in addition to the flushing action of the liquid also induce a mechanical scrubbing of the elongated apertures, such that a very high degree of cleaning is achieved, an thereby an improved hygienic standard for the entire conveyor belt is provided.

In a still further advantageous embodiment of the invention, the conveyor may, depending on its particular use, be provided with additional features on each or selected chain links, which features are selected from or combined from the following:

on the outermost side surfaces of the outermost front hinge parts on either side of the conveyor belt, an especially reinforced wear plate, for example made from or comprising Kevlar may be provided;

rollers arranged for rotation around an axis perpendicular to the top surface and where the rollers extends slightly outside the side surfaces, where the rollers either are arranged as snap on units or as integrally moulded with the chain links may be provided;

compartment members arranged perpendicular to the top surface and extending substantially the entire width of the chain link;

side plates extending substantially perpendicular to the top surface, and parallel to the sides of the chain links, and having an extend in the direction parallel to the sides such that the side plates extends beyond the chain links front and/or back end;

ribs provided parallel to the intended transport direction of the conveyor, where said ribs extends perpendicularly from the top surface of the chain links;

guidance flanges provided on the sides and extending from the sides, such that the top surface of the flanges are lower the top surface of the chain link, where the guidance flanges either may be integral with the chain links or be provided as snap on flanges;

friction enhancing substances are applied to the top surface of the chain links, such as for example rubber or the like.

The wear plate, and especially when this is made from a Kevlar based material, is substantially tougher than the traditional plastic types which the chain links are moulded from. A substantial wear may arise in the conveyor belt when the belt is forced through relatively tight turns, whereby the chain links engages with the side supports of the conveyor structure on which the conveyor belt is mounted. Advantageously, the wear plates may be snap-on parts such that they may be easily replaced from time to time during normal service and maintenance of the conveyor belt. Alternatively, the outermost sections of the chain links may be moulded such that the reinforcement, for example Kevlar, is integral with the chain link.

The compartment members which are arranged as small wall between adjacent chain links serve to help transport materials placed on the conveyer up or down inclines in the conveyor's run. This is particularly interesting when the materials or object to be transported are granular, or where low friction between the objects and the chain links are present, for example due to the presence of water or other materials. The compartment members will, therefore, maintain an even distribution of load on the conveyor belt as the conveyor belt travels up or down inclines in the conveying structure.

The side plates serve to maintain the materials or objects within the area of the conveyor belt. Especially for granular materials or objects having a low friction connection with the conveyor belt, the speed with which the conveyor belt travels, and especially the speed through turn, might result in centrifugal forces forcing the materials or objects to one or the other side. If the side plates were not present, there would be a risk that the materials would be ejected from the conveyor belt. Additionally, the side plates serve to increase the loading capabilities of the conveyor belt in that, in particular for granular materials, a channel shaped conveyor belt is constructed. For this purpose, it is also important that the side plates extend beyond the extent of the chain links such that an overlap between two side plates is provided.

For some purposes, ribs provided extending from the top surface of the conveyor belt serve two purposes; firstly, where the materials, and in particular objects are transferred from one conveyor belt to a conveyor belt according to the invention, it might be advantageous to have the ribs in order to facilitate a well-defined surface for these objects. At the same time, the ribs serve to provide extra drainage in processes where substantial amounts of liquid, and in particular water, have to be part of the process. In this manner, the ribs serve to elevate the objects from the top surface of the conveyor belt such that additional drainage is provided between the ribs for guiding the excess liquid to the drainage openings provided by the apertures between the rear hinge parts in the chain links.

In some applications where conveyor belts according to the present invention are used, the high travelling speed of the belt in combination with the side-flexing capabilities of the belt may give rise to rattling, or one or several chain links trying to escape the transport plane. For this purpose, the chain links may be provided with guidance flanges which extend from the sides of the chain links. In the conveyor structure, which usually is made from steel, guidance members may be provided at appropriate sections of the conveyor belt for engagement with the guidance flanges in order to maintain the chain links, and thereby the conveying surface in an even transport plane. The guidance flanges may be provided as snap-on features, which may be applied to all or several of the chain links in the conveyor belt, or they may be provided as integral parts of the outermost parts of each chain link.

In order to maintain a high speed of the conveyor belt, it may be advantageous to improve the friction capabilities of the transport surface such that articles, granulates or objects transported on the top surface of the chain links, and thereby the conveying surface, may have an increased friction such that transport and stable positioning on the conveyor belt's transport surface is provided. In a particularly advantageous embodiment of providing friction enhancement, a rubber composition may be sprayed on the newly injection moulded plastic chain links while there are still very hot. By doing it immediately after de-moulding, a chemical bond is created between the chain links and the friction enhancing material such as rubber. This provides for a very long-lasting durable and relatively cheap friction enhancement of the chain links.

The chain links may in a further embodiment be made from one or more of the following group of materials:
- plastics such as PP, PE, PVC, Acetal and others where the materials may comprise additives such as silicone oils, Teflon and the like, and in particular plastic materials suitable for moulding and injection moulding in particular;
- metals either castable metals such as steel, copper, aluminium, and suitable alloys or in sheet form where the blanks made from for example steel or aluminium are processed for example by rolling, bending or shaping into chain links;
- composites either comprising resins or cement as binders and optionally fibre reinforced composites, where fibres may be chosen from glass-, plastic-, steel-, cellulose- or other suitable fibres.

The choice of material naturally depends on the particular application of the conveyor belt and the supporting conveyor structure. For a number of applications, especially in the food processing industry, chain links made from a plastics material are preferred, whereas in other industries, depending on the environment in which the conveyor is operating, other materials may be preferred.

The additives, such as Teflon®, silicone and molybdenum sulphide, serve to reduce the friction between the links such that operating noise and heat generated by the chain links may be kept at a minimum. Obviously, the choice of additives in particular for applications in the food processing industry must be suitable and approved for such used. The additives are, usually, added to the raw materials from which the links are manufactured, such that the additives, and thereby the advantageous features of the additives, are integral in the materials used.

In a further advantageous embodiment, one or more sprocket wheels may be provided for engaging and propelling the conveyor belt, relative to a conveyor structure, where each sprocket wheel comprises a number of sprockets arranged along the wheels circumference, such that the sprockets are adapted for engagement with the bottom of one or more of the apertures provided between the hinge parts. The inventive construction of the chain link makes it possible for the sprockets on the sprocket wheel to engage directly in the bottom sections of the apertures arranged between the hinge parts. In the prior art, cams are often provided on the underside of the chain links being transverse to the travelling direction, such that the drive wheels may engage the cams in order to propel the chain links, and thereby the entire conveyor belt. This, however, is not necessary with the chain links and thereby the conveyor belt according to the present invention in that the sprocket wheel may engage directly in the apertures provided between the hinge parts.

In a further advantageous embodiment of the conveyor, the one or more sprocket wheels may have to parallel rows of sprockets arranged along the wheels circumference, where the sprockets in a first row are offset in relation to the sprockets in a second row, such that the sprockets in the first row are suitable for engagement with the apertures on one end of the chain links for propelling the conveyor belt in a first direction and that the sprockets in the second row are suitable for engaging the apertures in the opposite end of the chain links for propelling the conveyor belt in the opposite direction. By having a double sprocket wheel where one set of sprocket engages the apertures between the hinge parts on one end of the chain links, and a second set of sprockets which are off-set such that they are adapted to engage the apertures between the rear hinge parts on the other side of the chain link, it is possible to provide a conveyor belt which is reversible in that the sprocket wheels may be rotated in any direction with the same good and firm engagement via the sprockets to the chain links such that the rotational forces provided to the sprocket wheels is transferred by the sprockets to the chain links, and thereby to the conveyor belt.

Although above the invention has, in some embodiments, been described with reference to chain links and conveyor belts made from plastic materials, and in particular injection moulded chain links, it is also contemplated within the scope of the present invention that the chain links may be manufactured from different materials. For example, the links may be manufactured from blanks of a steel or other metal material such that the blank corresponds to the entire surface of a chain link. By simply rolling the blank on itself, and thereby creating the three-dimensional shape of the chain link, a chain link according to the invention may be manufactured. Also, for other materials such as aluminium or aluminium alloys it is possible to cast separate chain links in appropriate moulds. This is also true for other castable materials such as for example fibre reinforced plastics, fibre reinforced composite materials, cement based composites with or without fibre reinforcement, etc.

In a further advantageous embodiment, one or more electrical and/or hydraulic motors are provided for driving one or more axles engaging one or more sprocket wheels arranged at predetermined distances along the conveying path for driving the conveyor belt, and that one motor is designated master motor where output from the master motor is used as input for controlling and synchronising output of drive forces from the other motors and that optionally counter rollers are provided for countering the possible deformations in the conveyor belt caused by the one or more sprocket wheels, and that said counter rollers are arranged on the opposite side of the belt as to the engaging sprocket wheels.

Especially for long conveyors, i.e. conveyors having a long conveying path of for example 40-50 m, and possibly comprising a number of turns, it is necessary to provide more than one belt drive mechanism. However, more drive mechanisms, each comprising a motor, create a disturbance in the chain link as for example extra tension around the engagement position in the belt. Furthermore, due to even minor differences between the motors, unevenness will be created in the conveyor belt. This causes articles conveyed to become unstable, whereby the belt needs to be operated at slower speeds such that the articles/objects are not displaced, fall over, are damaged or fall off the conveyor. It is, therefore, advantageous to designated one motor as the master, and when using electrical motors synchronise the other motors, for example by using VLT controls. Additionally, counter rollers may be provided in order to maintain the top side of the belt in the transport plane, especially around the places where the sprocket wheels engage the conveyor chain link belt. With these rollers, rattling, shaking and wobbling may be avoided.

BRIEF DESCRIPTION OF THE DRAWINGS

The invention will now be explained in detail with reference to the accompanying drawing, wherein an embodiment of the invention is disclosed.

DETAILED DESCRIPTION OF ILLUSTRATIVE EMBODIMENTS

Figure 1:
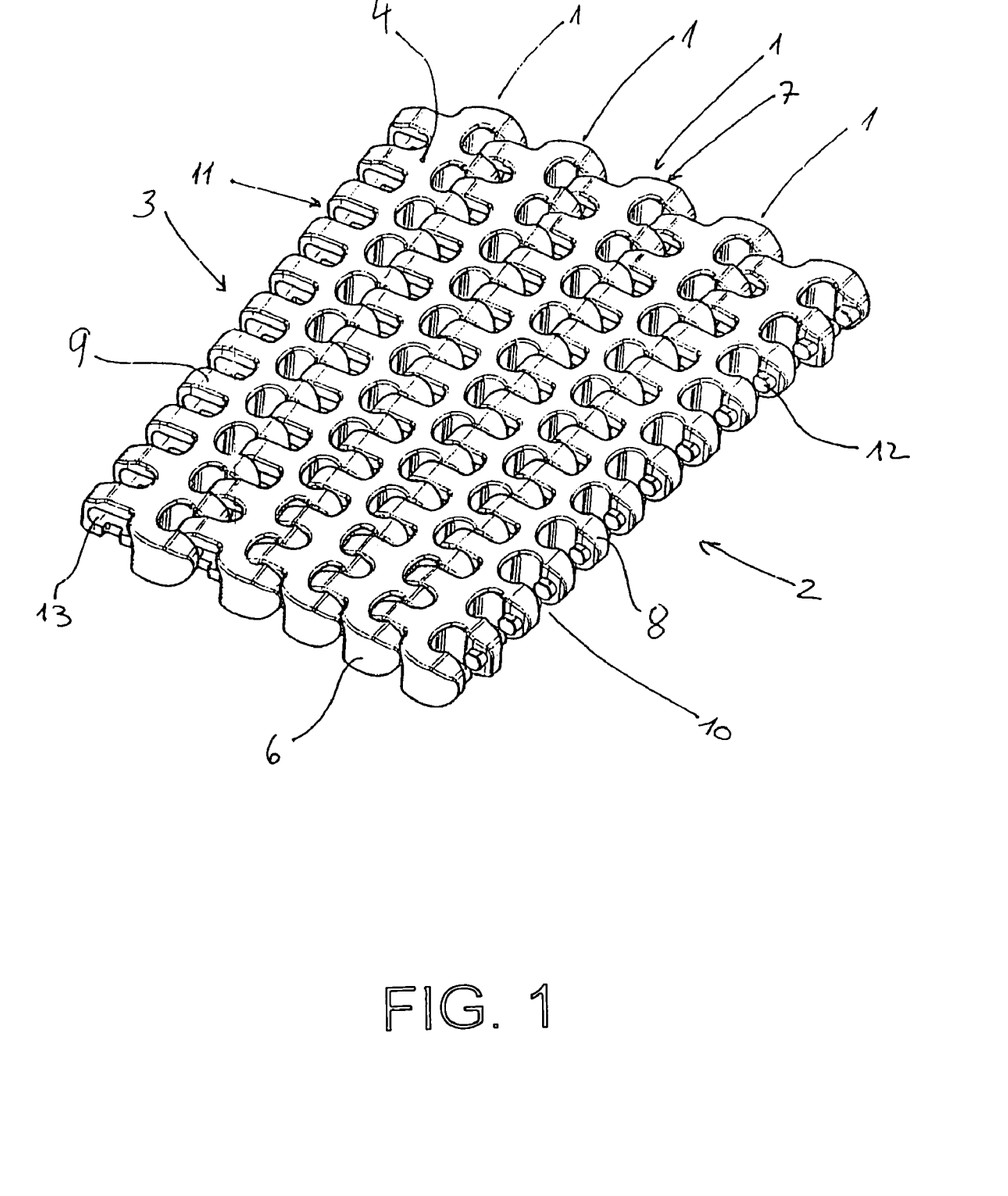
FIG. 1 illustrates a section of a conveyor belt assembled from a number of chain links

In FIG. 1 is illustrated a conveyor belt assembled from a number of identical chain links 1. Each link is defined by a front end 2, and a back end 3, a top surface 4, and a bottom surface 5 (see FIG. 2), and two sides 6, 7. Along the front and back ends 2,3, front hinge parts 8 and rear hinge parts 9 are arranged separated by apertures 10,11 such that the front hinge parts 8 arranged along the front end 2 may be inserted in the apertures 11 arranged between the rear hinge parts 9 along the back end 3.

The front hinge parts 8 along the front end 2 are provided with protrusions 12 which protrusions are of a size such that they will fit inside elongated apertures 13 arranged in the rear hinge parts 9 along the back end 3 of a chain link. In this manner, a side-flexing hinge connection may be established between two adjacent chain links such that a conveyor belt is created.

Figure 2:
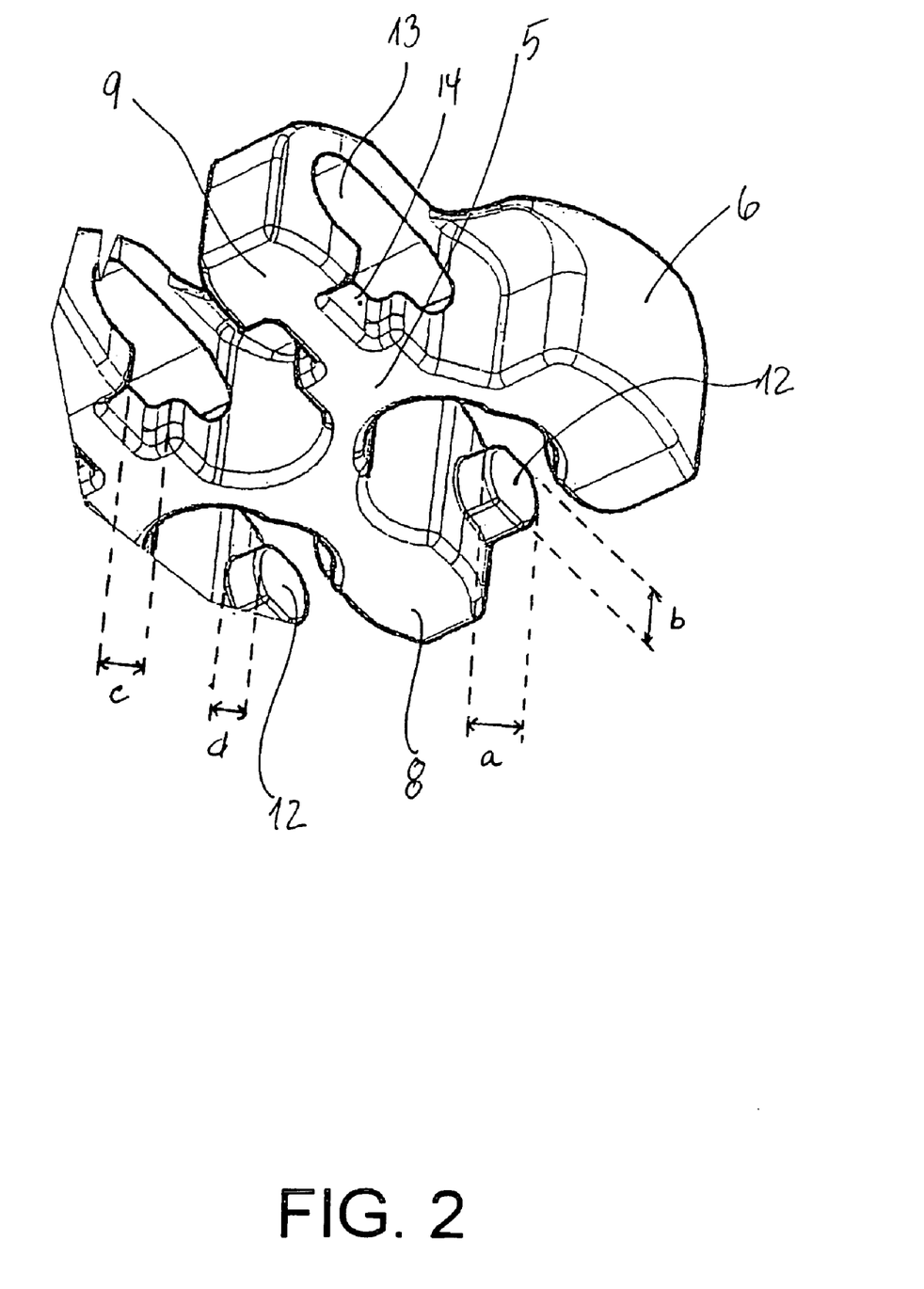
FIG. 2 illustrates a section of a chain link

Turning to FIG. 2, a section of a chain link 1 according to the invention is illustrated. The side 6 as well as the bottom surface 5 may be identified. The end of the chain link is illustrated as seen from below.

In the elongated apertures 13 provided in the rear hinge parts 9, a recess 14 is provided. The recess is shaped such that it has an opening "c" in the lengthwise direction of the conveyor belt, which is equal to or larger than the height "b" of the protrusion 12, perpendicular to the loading surface/top surface 4 of the conveyor belt. The length of the protrusion in the intended travelling direction of the conveyor belt is "a" and the relation between "a" and "c" is such that "a" is larger than "c", whereby the protrusions when arranged in the apertures 13 during normal travel will not be able to pass through the recess 14. In order to connect/disconnect two adjacent chain links, one chain link must be pivoted substantially 90° in relation to the other chain link such that the height dimension "b" of the protrusion may be passed through the opening "c" in the recess. The depth of the recess perpendicular to the intended travelling direction of the conveyor belt must be sufficient to accommodate the extent "d" of the protrusion 12. In this manner, a chain link is constructed which easily may be connected to identical chain links in order to create a side-flexing and hinged conveyor belt structure without the use of transverse rods or other secondary means, but which will be connected simply by providing protrusions in front hinge parts 8, which interact with elongated apertures 13 in rear hinge parts 9.

Figure 3:
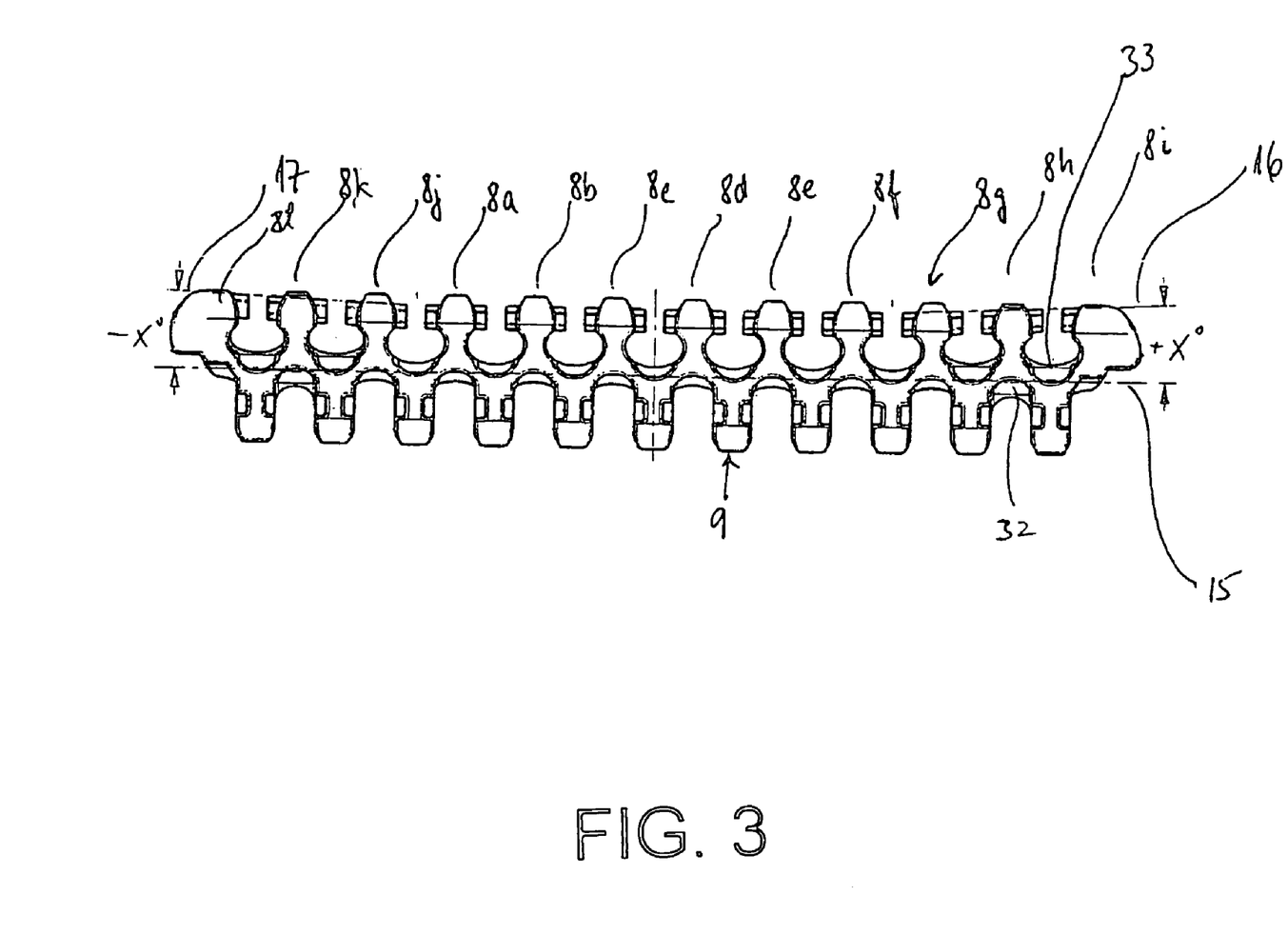
FIG. 3 illustrates the bottom side of a chain link

Turning to FIG. 3, a single chain link is illustrated from below. One of the main features and the reason why so many advantages are achieved with the present invention is the fact that the protrusions along the front end 2 are arranged parallel to, in the illustrated embodiment, three axis 15, 16 and 17. A first axis 15 is defined as being transverse to the links, i.e. substantially perpendicular to the intended travelling direction of the assembled conveyor belt structure. A number of these protrusions arranged on the centrally placed front hinge parts 8a-8f has protrusions which are arranged parallel to the first axis 15. On the outer front hinge parts in the illustrated example in the right-hand side of the depicted chain link 8g-8i, the protrusions are arranged parallel to a secondary axis 16. In a mirror image way concerning the outer front hinge parts 8j-8l, the protrusions are arranged parallel to a further secondary axis 17. Common for the two secondary axis 16,17 is the fact that they are angled plus or minus X° in relation to the first axis 15.

At the same time, the elongated apertures arranged in the opposite rear hinge parts 9 which are to receive the protrusions on adjacent chain links, are arranged such that the extend of the apertures all are arranged equally equidistant to the first axis 15. Hereby it is achieved that when two chain links of this type are assembled, and the resulting conveyor belt is running through straight sections of the conveyor, only the front hinge parts 8a-8f will engage the wall of the elongated apertures from the adjacent chain link. As the conveyor belt side-flexes due to the a turn in the conveying direction where the turn corresponds to the angle X, the right-hand side or left-hand side respectively arranged protrusion will engage the corresponding walls of the elongated apertures arranged on the adjacent chain link. In the illustrated example, the protrusions arranged on the front hinge parts 8g-8i will engage when the conveyor turns to one side, whereas the protrusions arranged in the front hinge parts 8j-8l will engage when the side-flexing conveyor turns to the opposite side. At the protrusions has been arranged along a straight line, a majority of the forces arising when the conveyor belt flexes should have been transferred to the chain link via one protrusion 8i or 8l respectively. Due to the flexibility inherent to the plastic material, a minor part of the forces could have been transferred to a neighbouring protrusion. This construction would, however, induce severe stresses in the chain link structure, whereby the chance or risk of terminal failure is greatly increased. The present invention, however, by distributing the forces over more hinge parts will have a substantially reduced built-up of stresses in the chain link such that failure may be avoided altogether.

In the illustrated example, the angle X is approximately equal to 2,2°. Other angles may also be chosen, depending on the overall design of the conveyor structure.

As is evident in particular from FIG. 1, but also from FIG. 2, is the fact that the front hinge parts 8 have the same extent in the width direction, i.e. parallel to the first axis 15, as the rear hinge parts 9. Therefore, only a very minimal play in the transverse direction of the entire conveyor belt structure is present. This, in turn, provides for a very stable and smooth running of the conveyor belt structure. The shape of the apertures between the front hinge parts is on one side in the shape of key holes. By this construction it is facilitated that even when the links are pushed together, which may be the case when the conveyor belt is negotiating a turn as illustrated in FIG. 1, it is possible to drain liquid from the surface of the conveyor belt structure. Alternatively, it may also be possible to circulate gas through the conveyor belt structure perpendicular to the transport plane such that a continuous cooling or heating of items placed on the conveyor belt may be carried out.

Figure 4:
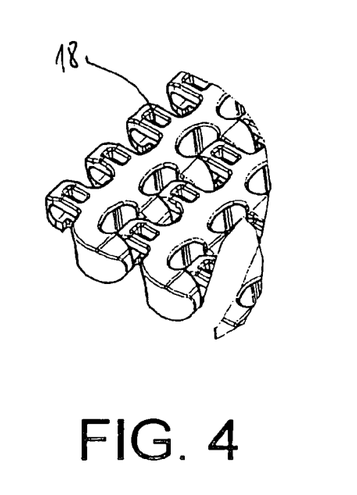
FIGS. 4-10 illustrate particular features of further embodiment in detailed views, where the features may be applied alone or in combinations.

An additional advantages with the present invention is its high degree of hygiene. The recesses 14 provided in the elongated apertures in the rear hinge parts 9 in addition to providing easy assembly and disassembly of adjacent chain links also provides for improved drainage of liquids present in the elongated apertures. The protrusions, which move back and fourth in the intended travelling direction of the conveyor belt structure, help to push foreign matter back and fourth in the elongated aperture such that this matter may be evacuated through the recess 14. By additionally providing, as illustrated in FIG. 4, an aperture 18 in the rear hinge parts 9 connecting the top surface 4 of the chain link 1 with the elongated aperture 13, improved drainage from the top surface of the chain links is provided. Furthermore, it is possible to inject cleaning fluids, for example water, through the aperture 18, and thereby improved the cleaning fluid circulation around the protrusions in the elongated aperture 13, such that a high degree of hygiene may be achieved by removing the foreign matter which could otherwise be lodged between the elongated aperture 13 and the protrusions 12 arranged in the front hinge parts 8. The elongated aperture provides for movement of the protrusions 12 in the intended travelling direction of the conveyor belt, whereby the side-flexing capabilities of the conveyor belt structure is achieved. At the same time, the protrusion will, together with the cleaning fluid injected through the aperture 18, provide a very thorough cleaning of this base in the elongated aperture.

The inventive conveyor belt according to the invention may be provided with additional features as illustrated with reference to FIGS. 5, 6, 7, 8 and 9.

Figure 5:
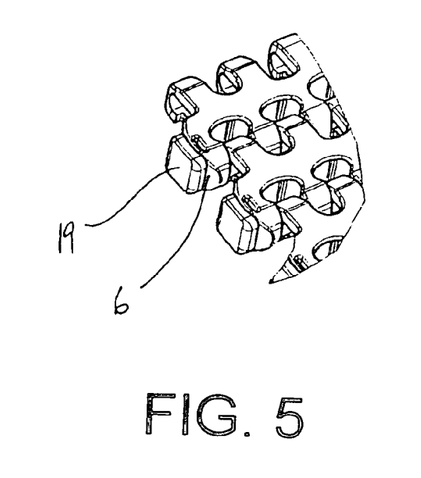

Turning to FIG. 5, wear plates 19 have been attached to the outermost sides 6,7 of the conveyor belt structure. As a conveyor belt of the side-flexing type travels through a turn as illustrated in FIG. 1, one side of the belt will be contracted whereas the opposite side of the belt will be expanded. Furthermore, in the side where the belt is contracted, it will usually be guided through the turn by a guidance member provided in the conveyor structure. Due to the very high speed of conveyors which, typically, travel at 60 m per second to 80 m per second, a substantial amount of friction between the side 6 and the guide member (not illustrated) of the conveying structure arises. This friction causes heavy wear, and also generates a substantial friction heat. In order to counter this, the chain links may, as illustrated with reference to FIG. 5, be equipped with wear plates 19. In the illustrated example, the wear plates 19 are attached to the side face 6 of the chain links. It should, however, be mentioned that the wear characteristics of the wear plate may also be integrated in the outermost front hinge part such that the superior wear characteristics are integral with the outermost front hinge parts of the chain links. The wear plate may be made from a wide range of materials, but especially preferred is Kevlar reinforced plastics, which in addition to having extremely good wear capabilities also are very heat-resistant. Additionally, the wear plates 19 may be provided with a Teflon®-coating or made be made from a material having low friction characteristics, such that the friction is reduced, and thereby the generated heat is also reduced.

Figure 6:
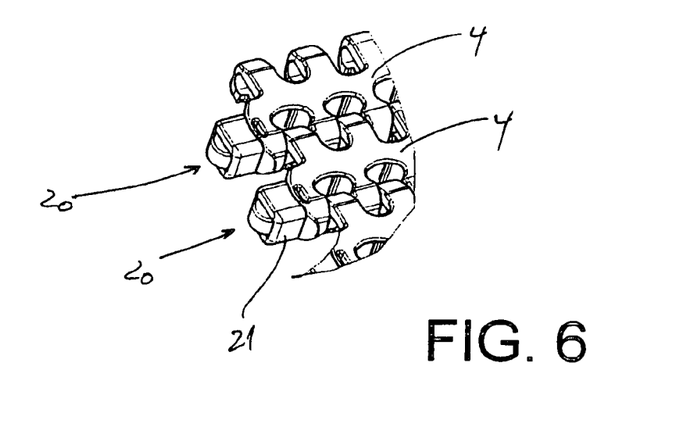

The reduction in friction and heat may also be achieved by providing rollers 20 as illustrated in FIG. 6. The rollers are arranged for rotation around an axis substantially perpendicular to the top surface 4 of the conveyor belt. The rollers are arranged such that they may roll on the guide member provided in the conveying structure. In this embodiment, the rollers are illustrated as being separate members 21 which may be snapped on to the end of the chain links 1. It should also be contemplated that the rollers 20 may be shaped integral with the outermost front hinge parts of the chain links such that rollers become an integral part of each chain link.

Although the wear plates 19 in FIG. 5 and the rollers in FIG. 6 have only been illustrated provided on a cut-out section of the chain links, it is naturally so that where the side-flexing conveyor belt is suitable for flexing to both sides, the additional features as mentioned above may be provided on both sides of the conveyor belt.

Figure 7:
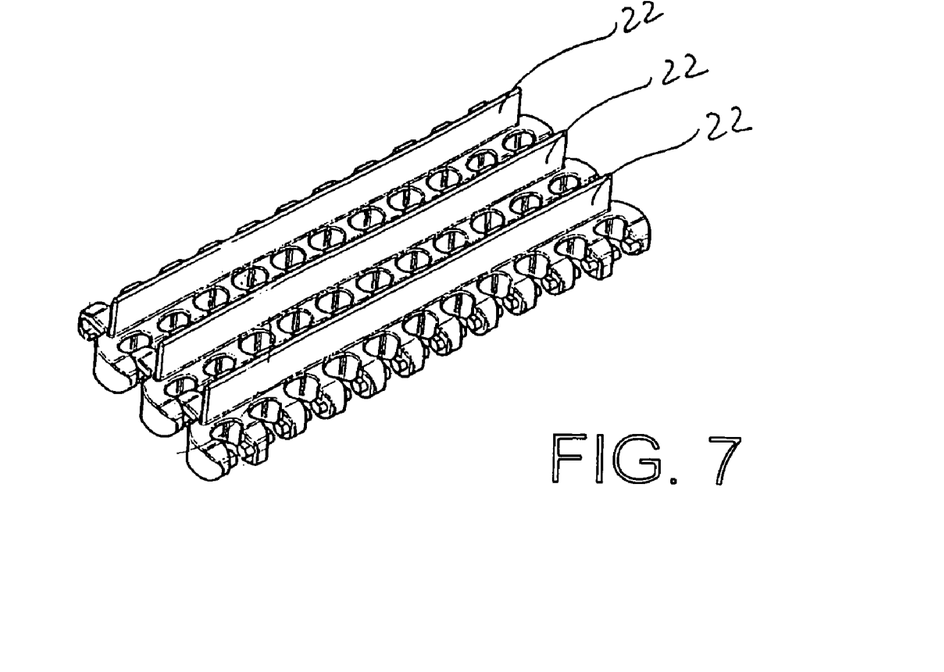

In FIG. 7, the top surface 4 of each chain link has been provided with compartment members 22. The compartment members 22 span substantially the entire width of each chain link. In the illustrated embodiment, the compartment members are moulded integral with the chain links, but they may also be provided as snap-on features, which may be installed afterwards. The compartment members serve to maintain the objects or items which are to be transported on the conveyor belt in their position on the conveyor belt, even when the conveyor belt is travelling up or down inclines in the conveying path. Although, in FIG. 7 each chain link is illustrated as having a compartment member, it will be possible to provide compartment members on every second, third or whatever chain link, depending on the size of the objects which are to be conveyed on the conveyor.

Figure 8:
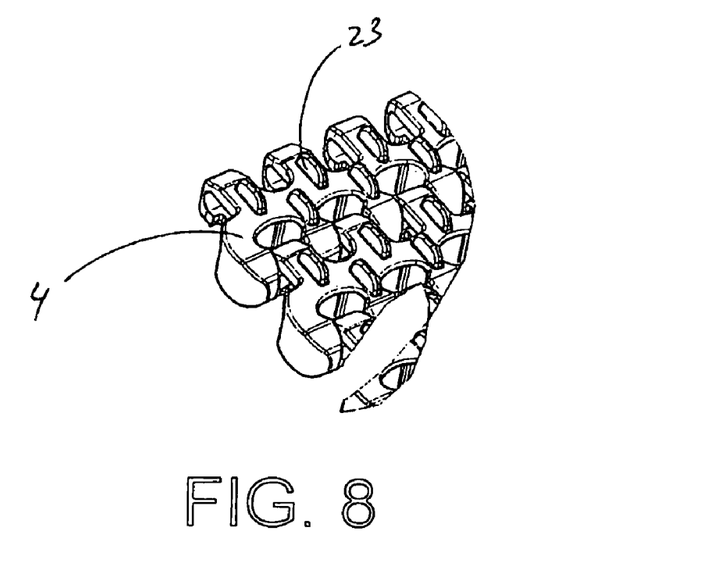

Turning to FIG. 8, the top surface 4 is provided with ribs 23. The ribs 23 are off-set in relation to each other such that a stable support will be provided for items, in particular cans, jars and the like, by the conveyor belt, but at the same time allowing of fluids and gasses to have improved drainage under and around the items, and through the key hole shaped apertures arranged between the hinge parts.

Figure 9:
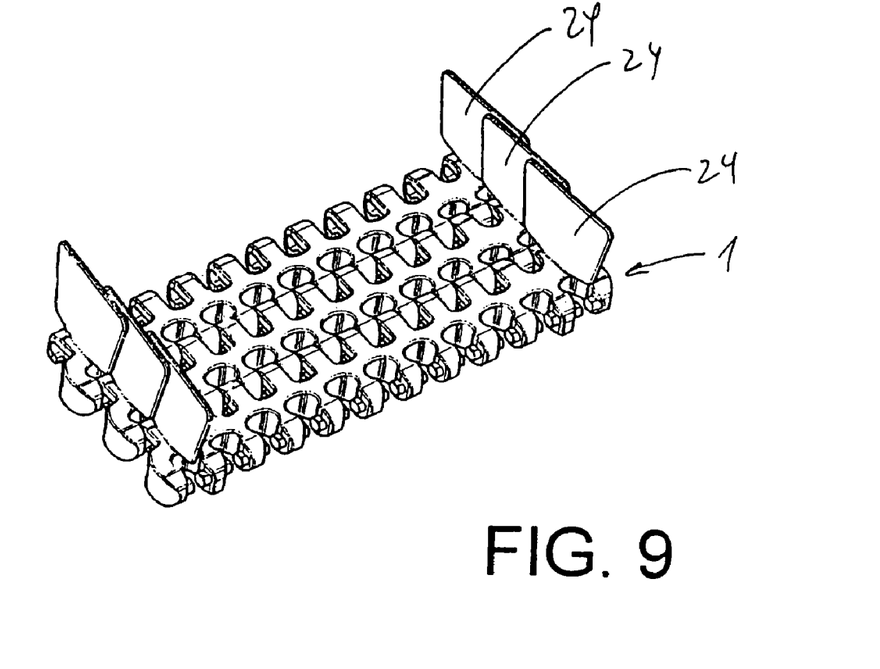

Turning to FIG. 9, the chain links have been provided with side plates 24. The side plates 24 are arranged along the sides of the chain links 1 such that even when the conveyor belt side-flexes through a turn, the side plates on adjacent chain links will overlap. By this construction a channel-shaped conveyor is created such that particular materials, such as for example peas, plums, berries and other fruits and vegetables, or granular materials, may be transported on the conveyor without the risk of overflowing the conveying structure. The openings in the top surface 4 of the conveying surface are in the preferred embodiment so small that fingers from personnel will not be able to be squeezed or stuck. Therefore, when conveying particular material, whether it be raw materials or food stuffs, it should be kept in mind that the particles conveyed should have a size which is at least slightly larger than the maximum openings. The maximum opening will occur when the distance between two adjacent chain links is the largest such that a substantial part of the key hole aperture provided in the front side of the chain link is exposed.

For a number of applications, it may be advantageous to combine the features mentioned above such that for example chain link provided with side plates also will have the integral compartment members in order to transport a sufficient load without having agglomerations of materials at the foot of inclines or the like.

Figure 10:
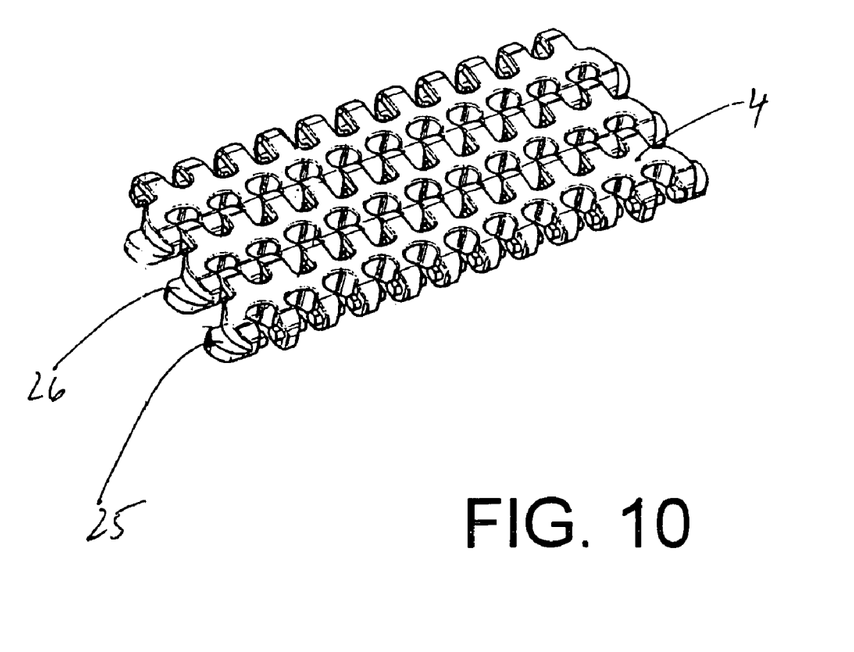

In a further advantageous embodiment, the chain link are provided with guide flanges 25 arranged in the outermost side parts of the chain links. The guide flanges have a top surface 26 which is lower than the top surface 4 of the chain link in relation to the rolling surface of the conveyor belt structure. The guide flanges are provided in order to avoid that chain links in one section of the conveyor belt structure wobble or are squeezed out of the transport plane, for example when going through turns where the tensions arising due to the pulling/pushing forces apply to the conveyor belt in order to provide the transport. For this purpose, the guide flanges cooperate with guide members arranged in the conveying structure (not illustrated) such that a guide member will overlap the surfaces 26 in order to maintain the top surface 4 of the chain links in a common plane. In practise, the guide members which interact with the top surfaces 26 of the flanges 25 are only provided along certain stretches of the conveyor belt where it is known that stresses in the conveyor belt may agglomerate.

It should be noted that although the compartment members 22, the ribs 23, the side plates 24, the guide flanges 25 as well as other features of the inventive chain link and resulting conveyor belt structure are described as independent features, any combination of features may be contemplated in that the skilled person would recognize the advantages achieved by applying of combining various of the inventive features in order to provide an overall conveyor belt structure which benefits from one or more of the advantages made possible by the present invention.

Figure 11:
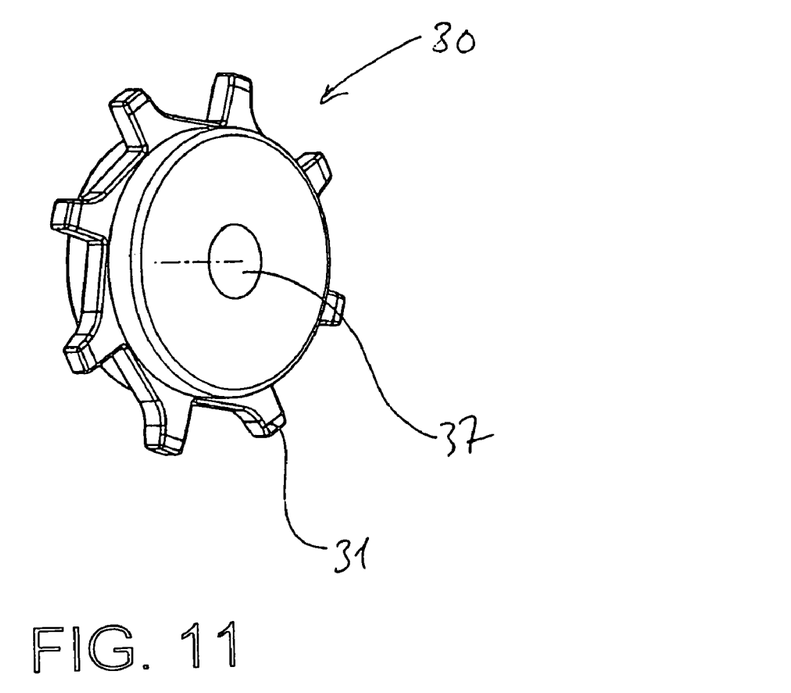
FIG. 11 illustrates a sprocket wheel for use with the conveyor belt links

Turning to FIG. 11, a sprocket wheel 30 is illustrated. Along the circumference of the sprocket wheel 30 a number of sprockets 31 are arranged. Each sprocket is designed to engage a bottom section 32,33 (see FIG. 3) in order to propel the conveyor belt along the conveying path. The shape of the sprockets 31 corresponds to the openings in the assembled conveyor belt structure once the links 1 are interconnected by arranging the hinge parts in the corresponding apertures between two hinge parts on the opposite side of a chain link such that only very small openings are provided.

Due to the inherent stiffness of the chain link structure according to the construction described above, a very limited number of sprocket wheels 30 may be necessary in order to propel the conveyor belt structure without the risk of distortion or destruction of the belt as such.

Figure 12:
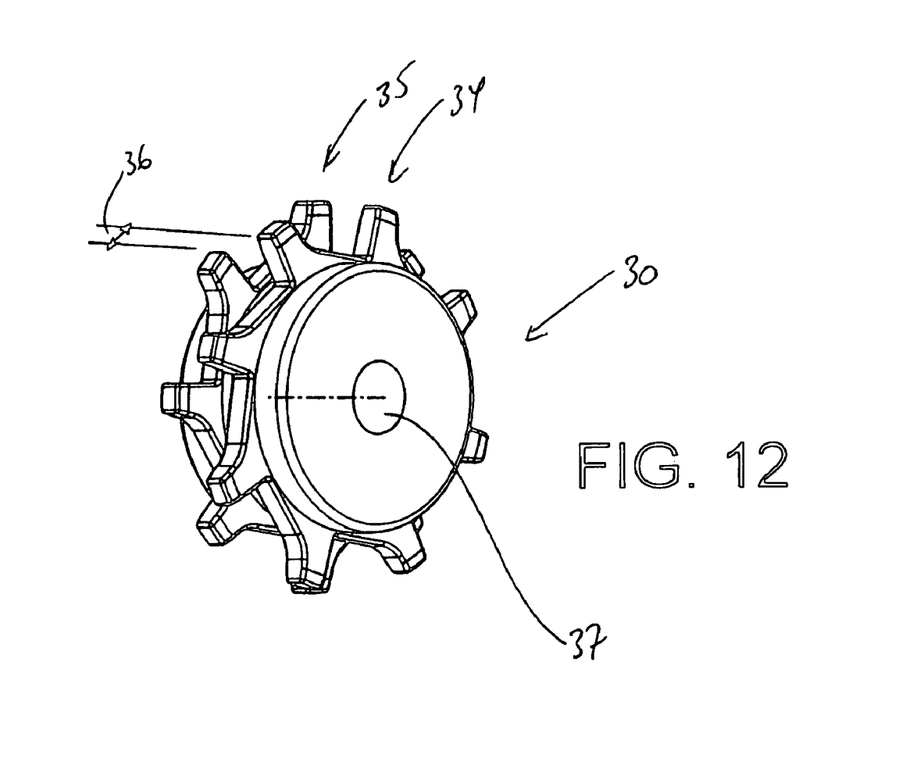
FIG. 12 illustrates a further embodiment of a sprocket wheel.

In an especially advantageous embodiment as illustrated in FIG. 12, the sprocket wheel 30 is provided with two parallel rows 34, 35 of sprockets along the circumference of the sprocket wheel. The sprockets in one row 34 are off-set in relation to the sprockets 35 in the other row. The distance of the off-set 36 is designed such that when rotating the sprocket wheel in a first direction, the first row of sprockets 34 will engage the bottom end sections 32 on each chain link in order to propel the conveyor belt in a first direction, and by counter-rotating the sprocket wheel 30, the sprockets in the second row 35 will engage the oppositely arranged bottom sections 33 in each chain link. The off-set 36, therefore, consequently corresponds to the distance in a lengthwise direction between the two bottom sections 32, 33. Furthermore, the distance perpendicular to the intended travelling direction of the conveyor belt between the two rows of sprockets 34, 35 corresponds to the transverse direction between the bottom sections 32, 33. In this manner, it will be possible with the same sprocket wheel to run the conveyor belt in two directions. As the conveyor belt, due to its inventive construction, does not have a preferred travelling direction, the conveyor belt is suitable for being rotated in either direction.

Although other features of the conveying structure as such has not been disclosed, it is understood that the inventive conveyor belt constructed by the chain link as described above will be suitable for any conventional conveying structure as such, and that the inventive sprocket wheels described above also may be mounted in connection with any well-known driving means such as for example an electric motor having an axle which may be arranged in the axle openings 37 of the sprocket wheels 30.

The invention claimed is:

1. A conveyor comprising an endless, side-flexing conveyor belt made from a plurality of rows of hinged interconnected belt links, where each row extends in a width direction substantially perpendicular to a traveling direction of the belt and comprises at least one link, where substantially all links further comprise:
   a front end substantially parallel to the width direction;
   a back end substantially parallel to the width direction;
   a top surface;
   a bottom surface;
   a pair of opposing side surfaces;
   front hinge parts separated by apertures arranged along the front end and having a top portion and a bottom portion that are substantially flush with the top and bottom surfaces respectively, two side portions, a free front portion, and protrusions on each side portion; and
   rear hinge parts separated by apertures arranged along the back end such that the front hinge parts of a link will fit inside the apertures on the back end of an adjacent link, and having a top portion and a bottom portion that are substantially flush with the top and bottom surfaces respectively, two side portions, a free front portion, and elongated apertures provided in the side portions of the rear hinge parts that are elongated in the traveling direction such that the protrusions on the front hinge parts fit inside the elongated apertures on an adjacent link;
   wherein the protrusions on one or more of the front hinge parts arranged centrally on the link are arranged on an axis substantially parallel to the width direction and the protrusions on one or more of the front hinge parts nearest each side of the link are arranged along a pair of respective axes that are angled such that the protrusion nearest each side surface is farther from the back end of the link than the next most outermost protrusion nearest the respective side surface, and wherein the angles of the axes of the protrusions nearest each side surface of the link are between 0° and 25° in relation to the width direction.

2. The conveyor of claim 1, wherein the angles of the axes of the protrusions nearest each side surface of the link are between 1° and 5° in relation to the width direction.

3. The conveyor of claim 2, wherein the angles of the axes of the protrusions nearest each side surface of the link are between 2° and 3.5° in relation to the width direction.

4. A chain link for assembly into a conveyer belt, comprising:
   a top surface, said top surface extending in both a traveling direction of the conveyer belt and a width direction perpendicular to the traveling direction, wherein the traveling direction and the width direction define a link plane;

a bottom surface substantially opposite to said top surface;

a front end and a back end connecting said top surface with said bottom surface;

a pair of opposing side surfaces;

front hinge parts separated by apertures arranged along the front end and having a top portion and bottom portion that are substantially flush with the top surface and bottom surface respectively, two side portions, a free front portion, and protrusions on each side portion; and rear hinge parts separated by apertures arranged along the back end such that the front hinge parts of the link will correspond with the apertures on the back end, and having a top portion and bottom portion that are substantially flush with the top surface and bottom surface respectively, two side portions, a free front portion, and elongated apertures provided in the side portions of the rear hinge parts that are elongated in the traveling direction such that the protrusions on the front hinge parts correspond with the elongated apertures;

wherein the protrusions on one or more of the front hinge parts arranged centrally on the chain link are arranged on a first axis substantially parallel to the width direction and the protrusions on one or more of the front hinge parts nearest each side surface of the chain link are arranged along a pair of second axes that are angled such that the protrusion nearest each side surface is farther from the back end of the chain link than the next most outermost protrusion nearest the respective side, and wherein the angles of the pair of second axes of the protrusions nearest each side surface of the chain link are between 0° and 25° in relation to the first axis.

5. The chain link of claim 4, wherein the angles of the pair of second axes of the protrusions nearest each side surface of the chain link are between 1° and 5° in relation to the first axis.

6. The chain link of claim 5, wherein the angles of the pair of second axes of the protrusions nearest each side surface of the chain link are between 2° and 3.5° in relation to the first axis.

* * * * *